United States Patent
Cosatto et al.

(10) Patent No.: US 10,296,796 B2
(45) Date of Patent: May 21, 2019

(54) VIDEO CAPTURING DEVICE FOR PREDICTING SPECIAL DRIVING SITUATIONS

(71) Applicant: NEC Laboratories America, Inc., Princeton, NJ (US)

(72) Inventors: Eric Cosatto, Red Bank, NJ (US); Iain Melvin, Hopewell, NJ (US); Hans Peter Graf, Lincroft, NJ (US)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 15/478,886

(22) Filed: Apr. 4, 2017

(65) Prior Publication Data
US 2017/0293815 A1 Oct. 12, 2017

Related U.S. Application Data

(60) Provisional application No. 62/318,852, filed on Apr. 6, 2016.

(51) Int. Cl.
*G06K 9/00* (2006.01)
*G06K 9/46* (2006.01)
(Continued)

(52) U.S. Cl.
CPC ........ *G06K 9/00805* (2013.01); *B60Q 9/008* (2013.01); *G06K 9/00201* (2013.01);
(Continued)

(58) Field of Classification Search
CPC .. G06K 9/00805; G06K 9/00201; G06K 9/46; G06K 9/4628; G06K 9/627;
(Continued)

(56) References Cited

U.S. PATENT DOCUMENTS 7,839,292 B2   11/2010  Wang et al.
9,007,197 B2 *  4/2015  Breed ................ G06K 9/00791
                                                           340/435
(Continued)

OTHER PUBLICATIONS

Chen et al, "DeepDriving: Learning Affordance for Direct Perception in Autonomous Driving", Proceedings of the IEEE International Conference on Computer Vision. Dec. 7-13, 2015. pp. 1-9.
(Continued)

*Primary Examiner* — Duy M Dang
(74) *Attorney, Agent, or Firm* — Joseph Kolodka (57) ABSTRACT

A video device for predicting driving situations while a person drives a car is presented. The video device includes multi-modal sensors and knowledge data for extracting feature maps, a deep neural network trained with training data to recognize real-time traffic scenes (TSs) from a viewpoint of the car, and a user interface (UI) for displaying the real-time TSs. The real-time TSs are compared to predetermined TSs to predict the driving situations. The video device can be a video camera. The video camera can be mounted to a windshield of the car. Alternatively, the video camera can be incorporated into the dashboard or console area of the car. The video camera can calculate speed, velocity, type, and/or position information related to other cars within the real-time TS. The video camera can also include warning indicators, such as light emitting diodes (LEDs) that emit different colors for the different driving situations.

17 Claims, 5 Drawing Sheets

(51) Int. Cl.
    *G06N 3/04*           (2006.01)
    *G06N 3/08*           (2006.01)
    *B60Q 9/00*           (2006.01)
    *G06K 9/62*           (2006.01)
    *G01S 19/13*          (2010.01)

(52) U.S. Cl.
    CPC .............. *G06K 9/46* (2013.01); *G06K 9/4628* (2013.01); *G06K 9/627* (2013.01); *G06N 3/04* (2013.01); *G06N 3/08* (2013.01); *G01S 19/13* (2013.01)

(58) Field of Classification Search
    CPC ........ G06K 9/3241; B60Q 9/008; G06N 3/04; G06N 3/08; B60R 21/01538; G06F 17/30241; A61B 5/18
    See application file for complete search history.

(56) References Cited

U.S. PATENT DOCUMENTS

| 9,286,524 | B1* | 3/2016 | Mei .................. G06K 9/6273 |
| 2015/0025784 | A1 | 1/2015 | Kastner et al. |
| 2016/0297433 | A1 | 10/2016 | Cosatto |

OTHER PUBLICATIONS

Lecun et al., "Convolutional Networks for Images, Speech, and Time-Series", The Handbook of Brain Theory and Neural Networks. MIT Press 1995.pp. 1-14.

\* cited by examiner

VIDEO CAPTURING DEVICE FOR PREDICTING SPECIAL DRIVING SITUATIONS

RELATED APPLICATION INFORMATION

This application claims priority to Provisional Application No. 62/318,852, filed on Apr. 6, 2016, incorporated herein by reference in its entirety. Moreover, the present disclosure is related to the subject matter of commonly assigned, U.S. application Ser. No. 15/478,823.

BACKGROUND

Technical Field

The present invention relates to neural networks and, more particularly, to a multi-modal driving danger prediction system for automobiles using deep convolutional neural networks.

Description of the Related Art

In this age of increasing driving distractions, drivers are ever more likely to fail to recognize potential danger in complex driving situations. Collision avoidance systems are becoming common in cars. These systems apply the brakes when the driver fails to notice obstacles at close range. These systems operate in a short time range and are mostly reactive. However, these systems do not predict danger on a longer time horizon, nor focus on the driver's attentiveness.

SUMMARY

A method is presented for predicting driving situations while a person drives a car. The method includes extracting feature maps from multi-modal sensors and knowledge data, training a deep convolutional neural network, with training data, to recognize real-time traffic scenes (TSs) from a viewpoint of the car, displaying the real-time TSs on a user interface (UI) within the car, and comparing the real-time TSs to predetermined TSs to predict the driving situations.

A system is presented for predicting driving situations while a person drives a car. The system includes multi-modal sensors and knowledge data for extracting feature maps, a deep convolutional neural network trained with training data to recognize real-time traffic scenes (TSs) from a viewpoint of the car, and a user interface (UI) within the car for displaying the real-time TSs and to warn of possible danger. The real-time TSs are compared to predetermined TSs to predict the driving situations.

A non-transitory computer-readable storage medium comprising a computer-readable program is presented for predicting driving situations while a person drives a car, wherein the computer-readable program when executed on a computer causes the computer to perform the steps of extracting feature maps from multi-modal sensors and knowledge data, training a deep convolutional neural network, with training data, to recognize real-time traffic scenes (TSs) from a viewpoint of the car, displaying the real-time TSs on a user interface (UI) within the car, and comparing the real-time TSs to predetermined TSs to predict the driving situations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The availability of on-board electronics and in-vehicle information systems has demanded the development of more intelligent vehicles. One such important intelligence is the possibility to evaluate the driving danger level to prevent potential driving risks.

The exemplary embodiments of the present invention introduce driver assistance systems which support the driver of a motor vehicle in driving the vehicle and/or warn him/her of special dangerous situations, for example, an imminent collision, or automatically initiate measures for avoiding the collision or for mitigating the consequences of the collision. Such determinations are based on a position finding system, in particular a radar or light detection and ranging (lidar) system, locating objects in the surroundings of the vehicle, such as other vehicles. The distances and relative velocities or speeds of the objects located in the surroundings of the vehicle are measured accurately by employing such position finding system to allow for a prediction of a special situation ahead.

The present invention provides the advantage that it makes detection of such special situations possible, so that appropriate countermeasures may be initiated or at least a warning may be output to the driver. The present invention is based on the principle that, while locating a single stationary object on the road is insufficient for inferring a potentially special (dangerous) situation, such situations may very well be detected when a set of a plurality of objects is considered together, and a characteristic signature is recognizable from the distribution of the position finding data such as, but not limited to, distances, relative velocities, relative speeds, and/or relative accelerations, which indicate a certain class of special situations.

The exemplary embodiments of the present invention relate to a driving situation predicting device having a video capturing unit for capturing real-time video of a driver driving a car and for making predictions on whether a special driving situation is imminent. If a special driving situation is imminent, the driver is notified with a warning.

Figure 1:
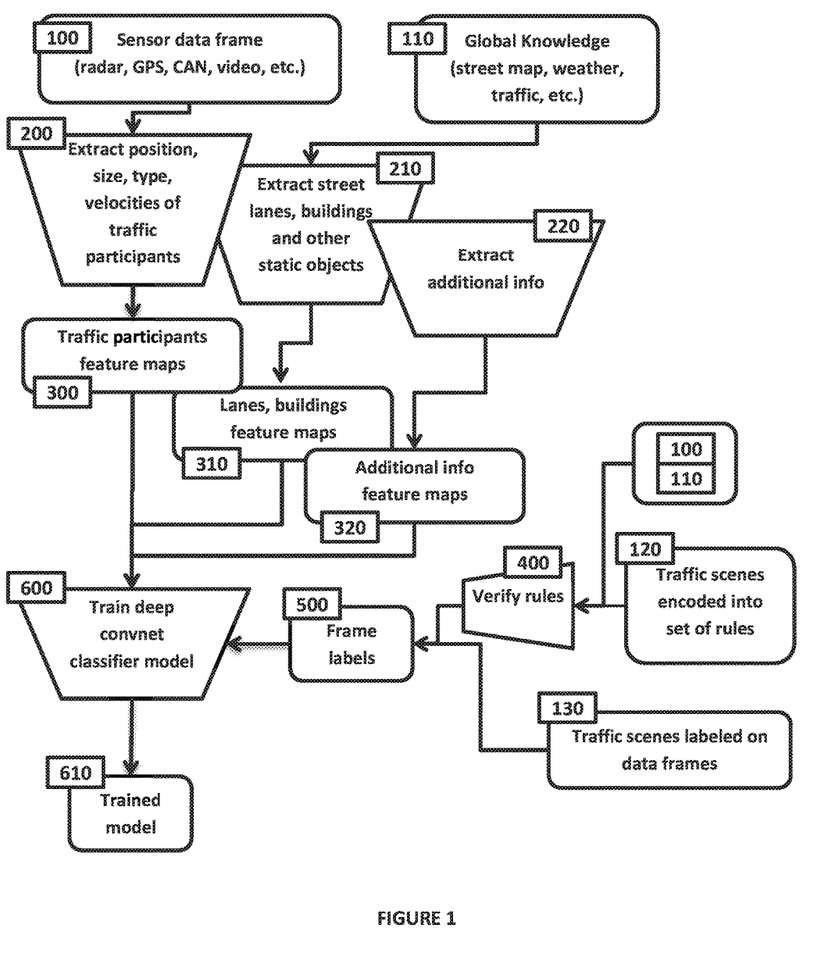
FIG. 1 is a block/flow diagram of a method for predicting dangerous situations ahead of time, in accordance with embodiments of the present invention.

Referring to FIG. 1, traffic scenes (TSs) are described by traffic participants (TP) (cars, trucks, bikes, pedestrians, etc.), geometry of the road (intersection, lanes, pedestrian crossing, signals, signs, etc.), information about surroundings (schools, train stations, bus stops, temperature, weather, traffic, etc.) and a status of the driving car (speed, driver status, car occupancy, radio, phone usage, etc.). The TSs can be captured by a plurality of sensors and video devices, such as video cameras. The TSs can be captured continuously and in real-time.

The TSs can be traffic environments pertaining to: peripheral road information related to a road located around a vehicle on which a dangerous drive predicting apparatus has been mounted; signal mechanism information related to a signal mechanism; peripheral vehicle information related to other vehicles which are driven around a vehicle; and parking lot information for indicating whether or not a parking lot is located around the vehicles and the like. The above-described peripheral road information corresponds to information for indicating whether a road along which the vehicle is driven is a single lane, a crossing, or a priority-sided road. The above-described signal mechanism information corresponds to information for indicating whether or not a signal mechanism is present, information for indicating whether or not the vehicle approaches a signal mechanism, and information related to signal light turning situations of the signal mechanism. The above-described peripheral vehicle information corresponds to information for indicating whether or not a preceding drive vehicle is present, information for indicating whether or not a succeeding drive vehicle is present, and information for indicating whether or not an intersecting vehicle is present.

The judgement as to whether or not the vehicle is being driven on a single lane may be made by judging, for instance, information held in a car navigation system to be mounted on the vehicle, or by detecting a lane line by operating a camera to be mounted on the vehicle so as to judge a curved degree of the lane line.

Also, the judgement as to whether or not the vehicle is being driven on a crossing may be made by judging, for instance, information held in a car navigation system to be mounted on the vehicle, or by detecting a signal mechanism, or a stop line by operating the camera to be mounted on the vehicle so as to measure a distance.

Figure 3:
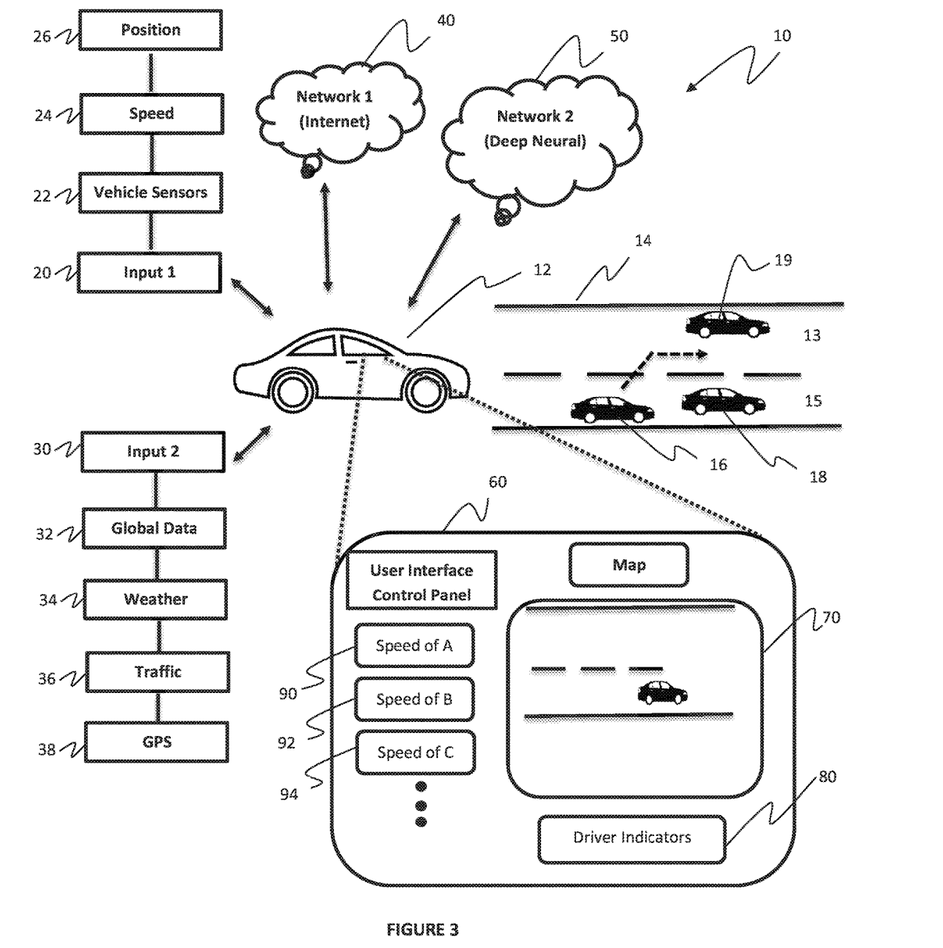
FIG. 3 is a block/flow diagram of a user interface (UI) of a car illustrating a dangerous situation on the road ahead, in accordance with embodiments of the present invention.

A driving danger prediction system is realized by continuously matching the current TS to a codebook of TSs or predetermined TSs that have been identified as leading to special situations, such as, but not limited to dangerous situations for a driver of a vehicle 12. When a match occurs, a warning can be transmitted to the driver of the vehicle 12 (FIG. 3). A traffic environment detecting unit (navigation units presented herein) can detect a shape of a road around the vehicle, into which the vehicle tries to enter; a condition whether or not a signal mechanism is present; a signal light turning situation; a condition whether or not a preceding drive vehicle is present; and the like. A driving characteristic determining unit (incorporated with the navigation units herein) can judge a traffic environment based upon the detected information, namely judges whether or not the traffic environment corresponds to such a previously determined traffic environment to which a dangerous driving situation has been assigned to.

Moreover, embodiments of the present invention describe how to fit an end-to-end convolutional neural network learning approach (convnet) to the challenge of matching TSs.

FIG. 1 depicts the flowchart of the system. Data arrives into the system from at least two sources. One source is sensor frame data 100 obtained dynamically at regular synchronized sampling intervals from various sensors throughout the car (e.g., radar, controller area network (CAN), video, global positioning system (GPS), etc.), and the second source of data 110 is from non-sampled sources such as the GPS street map or externally generated information such as weather, traffic info, etc. The TSs can be evaluated for captured content, such as cars, trucks, bikes, pedestrians, intersection, lanes, pedestrian crossing, signals, signs, schools, train stations, bus stops, etc. All this information is processed to create a number of feature maps.

Feature maps 300, 310, 320, which are two-dimensional pixel maps, are suitable for direct input into a convnet, and are extracted from input data to be entered into a training module 610.

At least three types of feature map extractors can be employed. The TP extractor 200, the static objects extractor 210, and the additional info extractor 220. The TP feature map extractor 200 uses sensors to extract position, size, type and velocities/speeds of traffic participants. Specialized automotive radar units are capable of extracting positions and velocities of several TPs simultaneously. Light detection and ranging (LIDAR) units are more precise and can sense the size of TPs more accurately. Video can be employed along with advanced processing techniques such as structure from motion (SFM) to obtain position, size and even type of TPs. When size and type cannot be obtained from one of the sensors, standard default values are utilized.

The radar system can detect the presence of an object (e.g., car) in a detection zone, obtain its distance and relative velocity. The camera system alone can also be used to detect the presence of the object (e.g., car) in its detection zone, obtain its distance, relative velocity and size information. Alternately, the radar system can be used to detect the presence of the object, its distance and relative velocity and the vision system can be used to confirm the above items and also to provide additional information about the size of the object. For pre-crash sensing applications, it is permissible to have both radar and vision based systems to ensure good performance under all weather conditions and also to provide redundancy for improved reliability.

The feature maps 300 are built from the TP extractor 200. The first feature map encodes position, size and type of each TP with oriented filled rectangles. The orientation is defined by a velocity vector and the type is encoded by filling a rectangle with a particular value. The second and third feature maps are velocity feature maps. The same approach as above is employed, except that normalized relative velocity amplitudes (forward and lateral, respectively) are used as fill values for the rectangles.

From the static object extractor 210, several feature maps may be built or generated depending on how rich the available map information is. First is the lane-accurate street feature map. The GPS sensor is employed to obtain an absolute position of the car in world coordinates and query a portion (e.g., a box) of a street map around those coordinates. Such queries are made either to a GPS map unit in the car or to a cloud server via, e.g., wireless connection. Depending on accuracy of the street map, detailed lane information may not be available (e.g., multi-lane roadways may be returned as single lines). In that case, video or dedicated lane-following units may provide detailed lane configurations. Otherwise, standard lane widths are used as an approximation. Each individual road lane is then drawn to the feature map using a value reflecting a type of road it is (e.g., highway, rural, etc.) and a direction of a lane (e.g., same as driving vehicle, opposite). Other feature maps may be generated from building, signage, tree, fences and other static objects. Bridge or tunnel segments may also be encoded to create separate feature maps.

The third type of feature map extractor 220 creates or generates feature maps including a single value 320. Such feature maps allow certain global parameters of a TS to be combined with a dynamic TP and static feature maps. One such parameter is a speed of a driving car. Such parameter is not included in the TP feature maps as all speeds are relative to the driving car and hence need to be inputted separately. Other global parameters such as weather (e.g., rainy, snowy, foggy, dark, etc.) can be inputted into those feature maps.

Further, other parameters detected by a vehicle information detecting unit are vehicle speed information, acceleration information, steering angle information, vehicle position information, and vehicle-to-vehicle distance information, which appear as a result obtained when an accelerator, a brake pedal, and a steering wheel, which are manipulated by a vehicle driver, control a vehicle. The vehicle speed information is related to a speed of the vehicle; the acceleration information is related to acceleration of the vehicle; the steering angle information is related to a steering angle thereof; the vehicle position information is related to a position of the vehicle, and the vehicle-to-vehicle distance information is related to a vehicle-to-vehicle distance. The drive information is such an information containing vehicle information.

Figure 2:
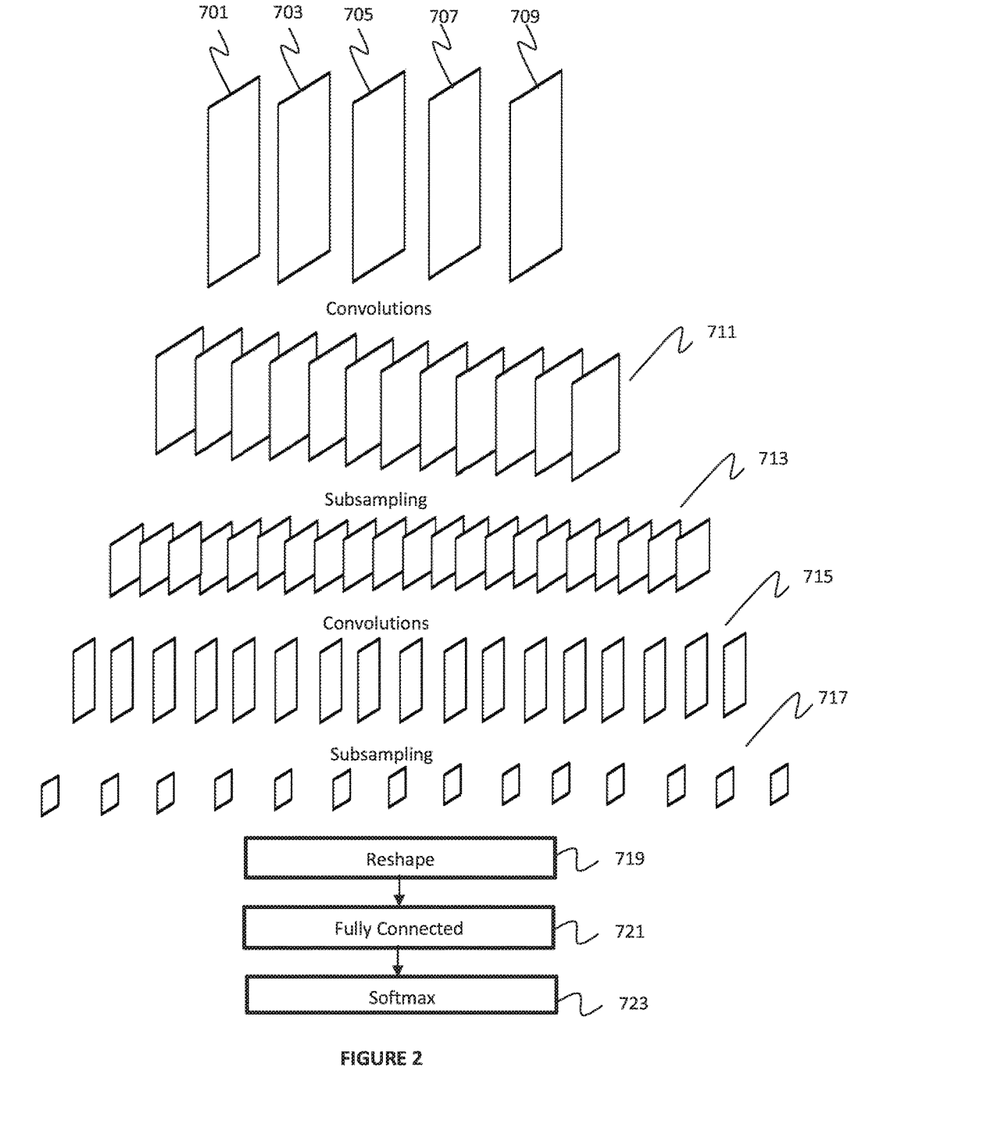
FIG. 2 is a block/flow diagram of an architecture of a deep convolutional neural network, in accordance with embodiments of the present invention.

The number and size of the feature maps dictates a complexity of the convnet model. FIG. 2 shows an example of a possible convnet with, e.g., five (5) feature maps of, e.g., size 20×100 pixels. An output layer of the convnet has as many outputs as a number of traffic scenes (TS) to be recognized.

In particular, a deep convolutional network (convnet) provides for a set of initial feature maps. These feature maps can be, e.g., a position feature map 701, a speed feature map 703 (in a direction x), a speed feature map 705 (in a direction y), a road feature map 707, and a global knowledge feature map 709. A convolution operation takes place to generate a second layer of feature maps 711. A sub-sampling operation then takes place to generate a third layer of feature maps 713. Another convolution operation takes place to generate a fourth layer of feature maps 715. Another subsampling operation takes place to generate a fifth layer of feature maps 717. The data is then reshaped 719 and fully connected 721. The fully connected layer 721 uses a softmax activation function 723 in the output layer.

Referring back to FIG. 1, as with all supervised learning approaches, a training set of labeled examples 500 is created. When employing a deep convnet, a sufficient number of training examples 500 is employed to train the deep convnet, so that it can generalize adequately. Hence, the exemplary embodiments of the present invention also describe an approach to generate large amounts of labeled sensor frame data 130 from recorded naturalistic driving datasets.

Initially, a set of constraints on sensor data variables is defined for all TSs that are to be detected. For example, a set of constraints for a particular TS would be: the driving vehicle's speed should be above 100 km/h, there should be a car in front at less than 30 m and that car's relative speed should be negative. That kind of description is a natural way to define a particular TS, yet can also be easily transcribed into computer code, resulting in a list of coded rules 120 for each TS. For each data frame, the variables of corresponding sensors are fed to the rule verification module 400. When all rules describing a TS are verified, the data frame 500 is labeled as belonging to that TS, otherwise a negative label is given to the data frame.

Using the input feature maps along with their corresponding label, a convnet model 600 can be trained by employing machine learning techniques.

Since, during normal driving, most of the time, no TS occur, negative examples need to be introduced into the training set. The number of negative examples is a parameter of the system.

A method and system for training the deep convnet to recognize complex traffic scenes from multi-modal sensors and knowledge data is further provided. The methods and systems further use a common representation to combine sensors of different modalities. The methods and systems use a two dimensional top-view representation of the traffic scene (TS) suitable for direct input to the deep convnet via a set of two dimensional pixel maps where the origin is set by a position of the driving car.

Radar sensor data is represented in three pixel maps by: (i) drawing oriented filled rectangles at positions and sizes corresponding to detected radar objects, at orientations based on a direction of their velocity, and filling pixels with a particular value, (ii) for the first pixel map, a value represents a type of object, (iii) for a second pixel map, a value represents an amplitude of a forward relative velocity, and (iv) for a third pixel map, a value represents an amplitude of a lateral relative velocity.

The methods and systems further introduce a GPS sensor for providing an instantaneous absolute location of the driving car on a street map that is represented by a set of pixel maps as follows: (a) a first pixel map is for lane-level detail around the driving car and is obtained by querying a map subsystem, (i) for systems that don't have lane-level detail, lane information can be obtained by video processing, or by using default lane width values for each type of roadway, and (ii) lanes are drawn onto a pixel map with values corresponding to a type of roadway. The lane position (from rightmost to leftmost) and whether the lane direction is the same or opposite direction as the driving car, and (b) additional pixel maps can be employed for intersections, signage and buildings. Similarly, the information can be drawn as shapes with a particular value.

Moreover, extra sensor data is represented in extra pixel maps by setting the entire pixel map to a certain value. Additionally, training data is labeled semi-automatically by (i) for each label, defining a set of constraints on the sensory variables and encode them into a set of computer rules and (ii) sensor data frames for which all rules are verified are assigned a corresponding label.

FIG. 3 is a block/flow diagram of a user interface (UI) of a vehicle illustrating a dangerous situation on the road ahead, in accordance with embodiments of the present invention.

System 10 includes a first vehicle 12 (vehicle A). The vehicle 12 is driving down a road 14. On the road 14, vehicle 12 encounters a second vehicle 16 (vehicle B), a third vehicle 18 (vehicle C), and a fourth vehicle 19 (vehicle D). The second and third vehicles 16, 18 are driving within lane 15, whereas the fourth vehicle 19 is driving in lane 13. User interface control panel 60 of the vehicle 12 indicates a special situation (e.g., a dangerous situation) to the driver of the vehicle 12. For example, it is detected from a traffic scene (TS) that the second vehicle 16 is attempting to pass the third vehicle 18 via lane 13 where the fourth vehicle 19 is also detected close by. The driver of vehicle 16 may have made a sudden move to pass vehicle 18, even though vehicle 19 is basically adjacent to vehicle 18. This could lead to a dangerous situation, such as an accident caused by the second vehicle 16.

The driver of vehicle 12 can view this special situation on a map 70 positioned somewhere within the vehicle 12. The user interface control panel 60 can display a plurality of different data/information to the driver of the vehicle 12. For example, a speed 90 of vehicle A can be displayed relative to a speed 92 of vehicle B and a speed 94 of the vehicle C. Of course, one skilled in the art can contemplate displaying a plurality of other information to the user (e.g., position information related to each vehicle A, B, C, D, etc.). The user interface control panel 60 can further display a plurality of indicators 80. The indicators 80 can be warning indicators, notifications indicators, alarm indicators, etc. The indicators 80 can be light emitting diodes (LEDs). The indicators 80 can display text. One skilled in the art can contemplate a plurality of different types of indicators.

The vehicle 12 can receive a plurality of inputs. For example, the first input 20 can include sensor inputs, such as vehicle sensors 22, speed/velocity sensors 24, and/or position sensors 26. Of course, other sensors can also be included for detecting/monitoring a plurality of other variables/parameters. Moreover, the vehicle 12 can receive second inputs 30, including, but not limited to, global data 32, weather information 34, traffic information 36, and/or global positioning system (GPS) data. Data/information can also be collected from one or more video cameras mounted on or within the vehicle 12 or from one or more video cameras in a vicinity of the vehicle 12 (e.g., within the immediate environment).

The vehicle 12 can further receive data/information from a plurality of networks. For example, the vehicle 12 can receive data from a first network 40 (e.g., Internet) and a second network 50 (e.g., a deep convolutional neural network). One skilled in the art can contemplate a plurality of other networks for communicating with the vehicle 12.

Figure 4:
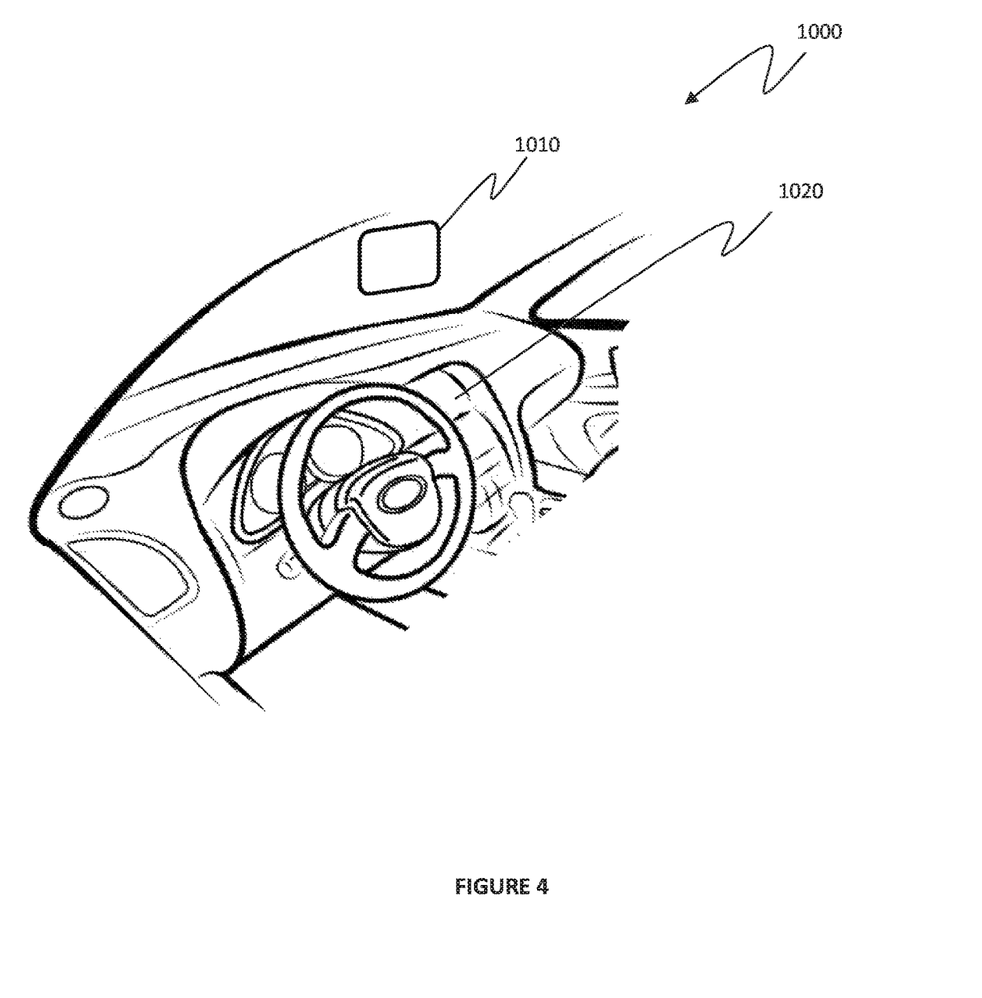
FIG. 4 is a block/flow diagram of an interior of an automobile depicting a navigation device mounted on a windshield or incorporated within a dashboard and/or console area, in accordance with embodiments of the present invention.

FIG. 4 is a block/flow diagram of an interior of an automobile depicting a navigation device mounted on a dashboard or incorporated within a dashboard and/or console area, in accordance with embodiments of the present invention.

The car interior 1000 depicts a navigation device 1010 mounted around or in proximity to a windshield area of the car. The car interior 1000 also depicts a navigation device 1020 incorporated within one or more console areas of the car. It is contemplated that the navigation devices 1010, 1020 can be incorporated or positioned on any interior portion of the car interior 1000.

Figure 5:
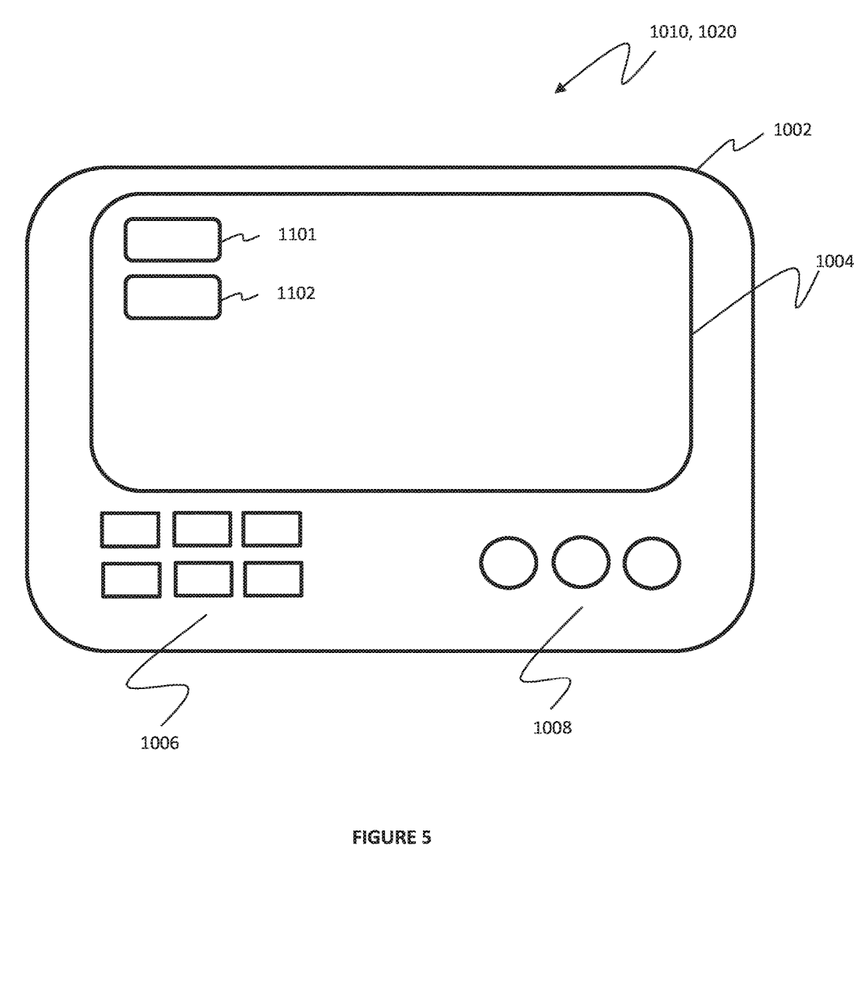
FIG. 5 is a block/flow diagram of the navigation device of FIG. 4 including a video camera for predicting one or more dangerous driving situations while a user drives the car, in accordance with embodiments of the present invention.

FIG. 5 is a block/flow diagram of the navigation device of FIG. 4 including a video camera for predicting driving situations while a user drives the car, in accordance with embodiments of the present invention.

The navigation devices 1010, 1020 can include a housing 1002 having a display screen 1004. The display screen 1004 can be, e.g., a light emitting diode (LED) display or an organic light emitting diode (OLED) display. The navigation devices 1010, 1020 can further include a plurality of control buttons 1006. The navigation devices 1010, 1020 can further include a plurality of indicators 1008. Additionally, a video camera 1101 and a global positioning system (GPS) 1102 can be incorporated with the navigations devices 1010, 1020.

The navigation devices 1010, 1020 can be portable and compatible with a number of different vehicles. Portable devices brought into a vehicle by, for example, a guest, who may not be the primary user of the vehicle, may also wirelessly communicate with the car system. Car systems may wirelessly communicate with the portable device by way of, e.g., a Bluetooth communication link. Conventional protocols for establishing a communication link via Bluetooth may first pair the system with the portable device by using a pin code to authenticate the portable device requesting the wireless connection. Once the pin code is authenticated and a media access control (MAC) address is saved by both the car system and the portable device, pairing is complete and the car system and the portable device can automatically establish wireless communication when the two are within communication range (i.e., the portable device is brought into the car).

The navigation devices 1010, 1020 can be attachable/detachable to different parts of the car. For example, the navigation devices 1010, 1020 can be attached to various portions of the center console or dashboard.

The navigation devices 1010, 1020 can operate with a car power system. The car power supply system provides i) power to crank start an engine through a starter motor and ii) continuous supply to vehicle systems either from a battery or from an alternator driven by the engine. This keeps the vehicle functioning through various controls and helps provide electrical command signals to respond to driver inputs and to satisfy passenger needs during usage of the vehicle. The power supply is of low voltage DC and is provided by a combination of a rechargeable lead acid battery and an alternator with an in-built rectifier and voltage regulator. The nominal voltage of the supply is normally 12 volts DC in cars and 24 volts on commercial vehicles.

The positive terminals of the battery and of the alternator are joined/connected to form a power supply positive terminal bus for the vehicle and power can be drawn through the bus from both sources or from either one of the sources. The power is distributed to various loads picking off power from the bus. The negative terminal of the supply system is connected to the body/chassis of the vehicle and the return lines from the loads placed at different locations on the vehicle are terminated at grounding studs welded/fitted at suitable locations on the vehicle body or chassis. The return currents from the different loads are returned to the negative terminals of the battery and the alternator through the body/chassis of the vehicle. The navigation devices 1010, 1020 can receive multiple inputs from the car power system described to monitor various components of the car power system.

The navigation devices 1010, 1020 can operate with any other components of the car. The navigation devices 1010, 1020 can receive input from any of the car components. For example, any car cameras or sensors or GPS units can provide their data/information to the navigation devices 1010, 1020. Additionally, braking system components, engine components, engine cooling system components, engine oil system components, fuel supply components, suspension and steering component systems, and/or transmission system components can be configured to electrically communicate with the navigation devices 1010, 1020 for maintaining optimal performance during detection of a special situation.

The navigation devices 1010, 1020 can operate with a controller employed to control the activation of a countermeasure system. Each countermeasure may have an individual actuator associated therewith. In that case, the controller may direct the individual countermeasure actuator to activate the countermeasure. Various types of countermeasure systems will be evident to those skilled in the art. Examples of a countermeasure within countermeasure system include occupant belt pre-tensioning, bumper height changing including nose dipping, braking, the pre-arming of internal airbags, the deployment of exterior or internal airbags, pedal control, steering column position, head restraint and knee bolster control. Preferably, the controller is programmed to activate the appropriate countermeasure in response to the inputs from the various sensors or from the navigation devices 1010, 1020.

The navigation devices 1010, 1020 can operate with braking system conditions sensors. Braking system conditions may be a sensor or sensors such as a brake pedal position sensor or a brake pressure monitor. The brake system conditions may be used to determine occupant driving characteristics and therefore provide an improved collision prediction and as a result provide an improved countermeasure deployment decision.

Exemplary embodiments of the present invention can be incorporated within a vehicle, such as an automobile, motorcycle, etc. The exemplary embodiments of the present invention can be represented or displayed on a user interface (UI) within a vehicle. The UI can provide data/information to the driver of the vehicle in real-time and on a continuous or periodic basis. The data/information can be related to a plurality of different variables/parameters detected and/or monitored, either within the immediate vicinity or environment of the vehicle or from external sources. In one aspect, traffic scenes (TSs) are recognized and compared to predetermined or predefined TSs in order to predict dangerous situations ahead of time. In another aspect, the data/information is represented as feature maps, that is, two-dimensional pixel maps to be fed directly into a deep convolutional neural network including trained data/information.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A video device for predicting driving situations while a person drives a car, the video device comprising:
    multi-modal sensors and knowledge data for extracting feature maps;
    a deep convolutional neural network trained with training data to recognize real-time traffic scenes (TSs) from a viewpoint of the car; and
    a user interface (UI) for displaying the real-time TSs and to warn of possible danger, wherein the real-time TSs are compared to predetermined TSs to predict the driving situations,
    wherein the training data is labeled semi-automatically by defining a set of constraints on sensory variables for each label, encoding each label into a set of rules, and employing the multi-modal sensors for which all rules are verified and assigned to a corresponding label.

2. The device of claim 1, wherein the video device includes a video camera.

3. The device of claim 2, wherein the video camera mounts to a dashboard of the car.

4. The device of claim 1, wherein the video device is incorporated into the dashboard or console area of the car.

5. The device of claim 1, wherein the UI of the video device displays other cars driving in the real-time traffic scene (TS).

6. The device of claim 5, wherein the video device calculates speed, velocity and/or position information related to the other cars.

7. The device of claim 1, wherein the UI of the video device includes warning indicators for notifying the person of the driving situations.

8. The device of claim 7, wherein the warning indicators include light emitting diodes (LEDs) that emit different colors for the different driving situations.

9. A method for predicting driving situations while a person drives a car, the method comprising:
    extracting feature maps from multi-modal sensors and knowledge data;
    training a deep convolutional neural network, with training data, to recognize real-time traffic scenes (TSs) from a viewpoint of the car;
    displaying the real-time TSs on a user interface (UI) to warn of possible dangers; and
    comparing the real-time TSs to predetermined TSs to predict the driving situations,
    wherein the training data is labeled semi-automatically by defining a set of constraints on sensory variables for each label, encoding each label into a set of rules, and using the multi-modal sensors for which all rules are verified and assigned to a corresponding label.

10. The method of claim 9, wherein the video device includes a video camera.

11. The method of claim 10, wherein the video camera mounts to a dashboard of the car.

12. The method of claim 9, wherein the video device is incorporated into the dashboard or console area of the car.

13. The method of claim 9, wherein the UI of the video device displays other cars driving in the real-time traffic scene (TS).

14. The method of claim 13, wherein the video device calculates speed, velocity, and/or position information related to the other cars.

15. The method of claim 9, wherein the UI of the video device includes warning indicators for notifying the person of the driving situations.

16. The method of claim 15, wherein the warning indicators include light emitting diodes (LEDs) that emit different colors for the different driving situations.

17. A non-transitory computer-readable storage medium comprising a computer-readable program for predicting, by employing a video device, driving situations while a person drives a car, wherein the computer-readable program when executed on a computer causes the computer to perform the steps of:

extracting feature maps from multi-modal sensors and knowledge data;

training a deep convolutional neural network, with training data, to recognize real-time traffic scenes (TSs) from a viewpoint of the car;

displaying the real-time TSs on a user interface (UI) to warn of possible dangers; and comparing the real-time TSs to predetermined TSs to predict the driving situations, wherein the training data is labeled semi-automatically by defining a set of constraints on sensory variables for each label, encoding each label into a set of rules, and employing the multi-modal sensors for which all rules are verified and assigned to a corresponding label.

* * * * *